May 6, 1930.  A. W. FERGUSON ET AL  1,757,766
INDICATOR FOR SCALES
Filed Jan. 7, 1929
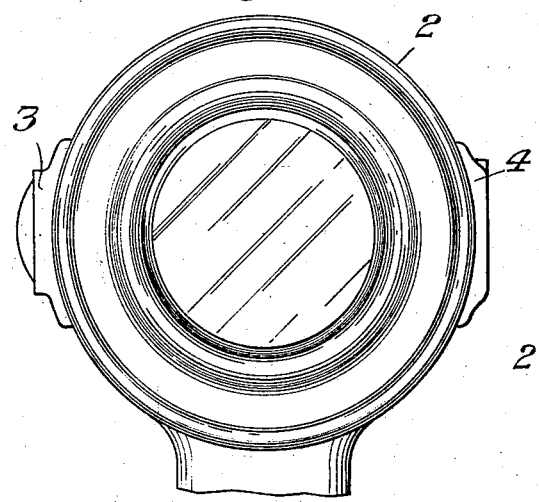
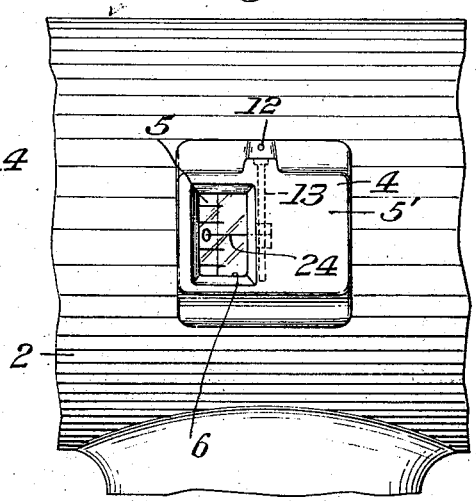
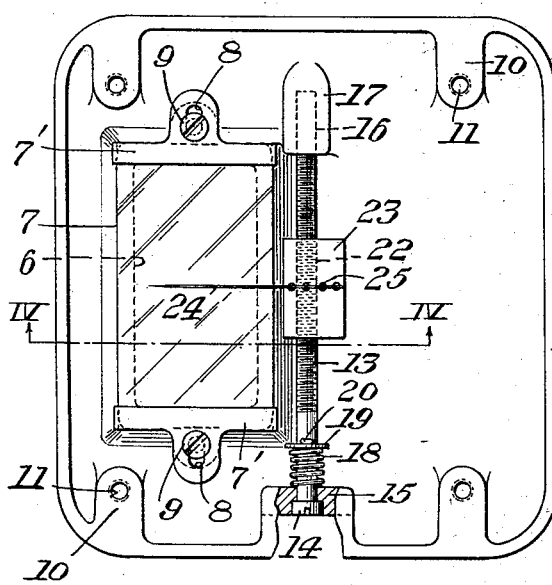
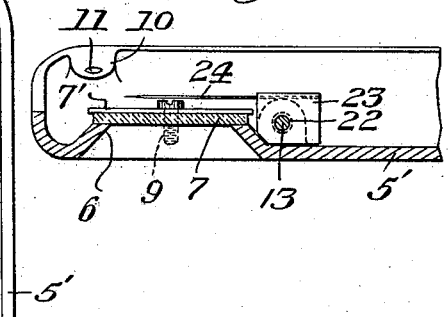
INVENTORS
Andrew W. Ferguson
Robert J. Burke
by Byrnes, Stebbins & Parmelee
their Attys Patented May 6, 1930

1,757,766

UNITED STATES PATENT OFFICE

ANDREW W. FERGUSON AND ROBERT J. BURKE, OF LATROBE, PENNSYLVANIA, ASSIGNORS TO LINCOLN SCALE CORPORATION, OF LATROBE, PENNSYLVANIA, A CORPORATION OF DELAWARE

INDICATOR FOR SCALES

Application filed January 7, 1929. Serial No. 330,727.

This invention relates generally to scales, and more particularly to an indicator which can be adjusted to coincide with the zero point, or other desired point, on a scale.

Drum scales commonly are provided with a front indicator used by the merchant and a rear indicator viewed by the customer. In assembling such scales, it is usually necessary to adjust the rear indicator so that it coincides with its zero point on the scale at the same time as the front indicator coincides with its zero point. One method heretofore employed for accomplishing this adjustment was to provide a supporting plate which could be secured to the scale drum casing. The plate had an opening which was covered with glass or other transparent material, and the glass was provided with a hair line. In order to make the indicator on the plate coincide with the zero point on the scale drum, the plate was secured to the drum casing in such manner that the whole plate could be removed. This arrangement required loosening the screws or other means used for connecting the plate to the drum casing. The glass was then moved in its supporting plate and the screws were again tightened. This arrangement frequently required that the supporting plate be removed and the position of the glass adjusted several times before the desired setting was obtained.

In accordance with our invention, we provide an indicator assembly comprising a frame which is permanently secured to the scale drum casing, and which has an indicator associated therewith adjustable with relation to the frame, and an opening in the frame. The desired adjustment may be made from the outside of the scale without removing the frame.

In the accompanying drawings which illustrate the present preferred embodiment of our invention, Figure 1 is an end elevation of a scale drum casing;

Figure 2 is a partial front elevation thereof;

Figure 3 is a view, to an enlarged scale, of the indicator assembly; and

Figure 4 is a section on the line IV—IV of Fig. 3.

Referring to the accompanying drawings, the scale drum casing 2 has a front indicator 3 which is used by the merchant, and a rear indicator 4 used by the purchaser. The scale drum 5 is provided with the usual divisions. The rear indicator assembly 4 comprises a frame or plate 5' having an opening 6 therein through which the scale drum may be viewed. The opening is covered by a piece of glass 7 which is maintained in position by clips 7'. The clips are provided with elongated holes 8 for the reception of screws 9, in order that the clips may be adjusted to take care of different sized pieces of glass.

The frame 5' is provided with bosses 10 having screw holes 11 therein for fastening the frame to the scale drum casing. A hole 12 is provided to receive a dowel pin on the drum casing.

An indicator adjusting screw 13 is mounted in the plate 5'. The head 14 of the screw fits in a recess in a lug 15 on the frame 5', and the opposite end 16 of the screw is guided in a lug 17 on the frame. A biasing spring 18 surrounds the screw adjacent its head and lies between the lug 15 and a washer 19, which washer is held in place by a cotter pin 20. The head of the screw is set in a recess so that a tool must be used to turn it and is slotted for a screw driver.

The indicator screw passes through a threaded opening 22 provided in an indicator block 23. The indicator block carries an indicator 24 secured thereto at 25. As shown in Fig. 4, the indicator block 23 is so shaped that it is prevented from rotating when the screw 13 is turned. Upon turning of the screw the block moves along the screw, carrying the indicator with it to the desired position. The adjustment is accomplished simply by rotating the screw by means of a screw driver, without the necessity of loosening any screws or other fastening means, and without changing the position of the frame 5' with respect to the scale drum casing.

We have illustrated and described the present preferred embodiment of our invention. It is to be understood, however, that the invention may be otherwise embodied without departing from the spirit of the invention or the scope of the appended claims.

We claim:

1. A drum scale having markings thereon, front and rear indicators, each indicator having an independent adjustment operable from the outside of the scale to cause the indicator to coincide with the markings on the drum.

2. A scale having a rotatable drum provided with markings thereon, an indicator, and means operable from the outside of the scale for moving the indicator relative to the markings on the drum without rotating the drum, to cause the indicator to coincide with the markings.

3. A scale having a rotatable drum provided with markings thereon, a front indicator and a rear indicator, and means operable from outside the scale for moving the rear indicator independently of the front indicator to cause the rear indicator to coincide with the markings on the drum.

4. A scale having a rotatable drum provided with markings thereon, a front indicator and a rear indicator, covers for the indicators, and means for moving the rear indicator independently of the front indicator but relative to the drum to cause it to coincide with the markings on the drum, said means being operable without removing the rear cover.

5. A drum scale having markings thereon, front and rear indicators, each indicator having an independent adjustment operable from the outside of the scale to cause the indicator to coincide with the markings on the drum, the adjustment for one of the indicators comprising a screw mounted in the frame of the scale and having an indicator movable along the screw when the screw is rotated, and means for rotating the screw from the outside of the scale.

In testimony whereof we have hereunto set our hands.

ANDREW W. FERGUSON.
ROBERT J. BURKE.